United States Patent

[11] 3,599,013

[72] Inventor Robert W. Cope
Sparks, Md.
[21] Appl. No. 800,035
[22] Filed Feb. 7, 1969
[45] Patented Aug. 10, 1971
[73] Assignee The Bendix Corporation

[54] SQUARING AND SQUARE-ROOT-EXTRACTING CIRCUITS

13 Claims, 2 Drawing Figs.

[52] U.S. Cl. .... 307/229, 307/255, 328/144
[51] Int. Cl. .... G06g 7/24
[50] Field of Search .... 328/144; 307/229, 255, 238; 235/193.5

[56] References Cited
UNITED STATES PATENTS

| | | | |
|---|---|---|---|
| 3,152,250 | 10/1964 | Platzer, Jr. | 307/229 X |
| 3,354,321 | 11/1967 | Meyer | 307/255 X |
| 3,423,578 | 1/1969 | Platzer, Jr. et al. | 235/193.5 |

*Primary Examiner*—Donald D. Forrer
*Assistant Examiner*—B. P. Davis
*Attorneys*—Plante, Arens, Hartz, Hix and Smith, Bruce L. Lamb, William G. Christoforo and Lester L. Hallacher ABSTRACT: Squaring and square-root-extracting circuits are described which use transistors as the active elements. In the square-root-extracting circuit, input current through a first transistor establishes emitter to base voltage drop which is impressed along with a fixed voltage across the base electrodes of two oppositely poled second and third transistors serially connected emitter to emitter through which an output current flows. For this circuit, output current is the square root of input current. When used as a squaring circuit, input current is injected through the second and third transistors and output current is taken from the first transistor. A fourth transistor is provided to allow input current to be injected into the squaring circuit.

INVENTOR
ROBERT W. COPE

BY William G. Christoforo
ATTORNEY

SQUARING AND SQUARE-ROOT-EXTRACTING CIRCUITS

BACKGROUND OF THE INVENTION

This invention relates to squaring and square root extraction circuits and more particularly to such circuits which operate in the current domain and are comprised of forward-biased transistors.

There are known, simple and reliable multiplying circuits using semiconductor elements in which an output signal is produced which is proportional to theproductof two DC input signals. These known circuits generally comprise a pair of diodes or transistors connected as diodes (collector tied to base) shunted across a third diode or the base-emitter junction of a transistor. If the semiconductor junctions involved are biased to operate in the logarithmic region, the product of the current through each of the serially connected diodes individually is equal to the current through the third diode (or transistor). Of course, since the base-emitter voltage drop across the various semiconductor elements is approximately equal, some means must be provided to limit the voltage drop across the single diode to proper levels. This normally takes the form of an additional diode connected in series with the single diode, but which does not otherwise enter into the multiplying operation of this circuit.

To operate the known multiplying circuits as squarers and square root extractors it was merely necessary to inject the current through the serially connected diodes, which must be matched so as to produce equal voltage drops across each, to generate a current squared through the single diode in the case of a squaring circuit. For the square root extraction circuit, the reverse procedure is employed. That is, current is injected into the single diode and the resulting current through the serially connected diodes represents the square root of the injected current.

There are a number of limitations in the use of these known multiplying circuits. The dynamic range, that is the region in which a logarithmic response is obtained, is very much less for a diode and for a transistor connected as a diode than would be the case if a multiplying or dividing circuit were comprised of forward-biased transistors. Additionally, the *n* factor found in Shockley's equation and which will be shown below, generally is about 1.1 for present day transistors but can vary from 1.3 to 3.0 for diodes. Hence, circuits comprised of diodes with transistors will have some inaccuracy arising from the failure of the *n* factors to cancel in the circuit mathematical model. Problems also arise in temperature compensating these circuits due to the difficulty of temperature matching the diode to a transistor.

Accordingly, it is an object of this invention to provide a squaring or square root extraction circuit which is comprised of forward-biased transistors.

Another object of this invention is to provide a squaring or square root extraction circuit which is simply constructed and simple in its operation.

It is another object of this invention to provide a squaring or square root extraction circuit which is temperature stabilized.

One further object of this invention is to provide a squaring or square root extraction circuit which can be implemented in integrated circuitry form.

Still one more object of this invention is to provide a squaring or square root extraction circuit which is more accurate than prior art circuits of this type.

These and other objects of this invention will become apparent to one skilled in the art with a reading and understanding of the following description of the invention and claims.

SUMMARY OF THE INVENTION

The invention as herein described and shown in the drawings comprises squaring and square root extraction circuits operating in the current domain and whose active elements are forward-biased transistors. The invention makes use of the principle of logarithmic addition and subtraction followed by the extraction of the antilogarithm to give the product or quotient of two inputs. In the circuits to be described the inputs are made equal by using matched transistors so that the circuits operate as squarers or square root extractors. Forward-biased transistors operating within the logarithmic range of their V-I curves provide the logarithmic relationships required. Known current detectors and power supplies of the constant current and constant voltage type, which need not be fully described in this description, provide the various inputs and output detection of the invention.

PREFERRED EMBODIMENT OF THE INVENTION

It is known that when the logarithm of a quantity X is added to itself, the sum is equal to the logarithm of the square of the quantity.

It is also known that the forward voltage-current characteristic of a transistor is logarithmic over a considerable range. Additionally, in the logarithmic range the current flowing across the transistor PN junction as a result of the application of a base-emitter voltage, V, can be described by Shockley's equation as follows:

$$i=i_s\left(e^{\frac{qV}{nKT}}-1\right) \quad (1)$$

where $i_s$ = reverse saturation current
$q$ = electron charge
$K$ = Boltzmann's constant
$n$ a constant involving physical processes in the junction region ($n$-factor)
$T$ = absolute temperature If the junction is forward biased and V exceeds about 0.1 volt as is the case in the circuits herein which illustrate the invention:

$$i\approx i_s\left(e^{\frac{qV}{nKT}}\right) \quad (2)$$

Simplifying equation (2) and assuming that, in the circuits to be shown which apply the results of this mathematical development, all transistors are matched to be identical:

$$V=\frac{nKT}{q}\ln\frac{i}{i_s} \quad (3)$$

Figure 1:
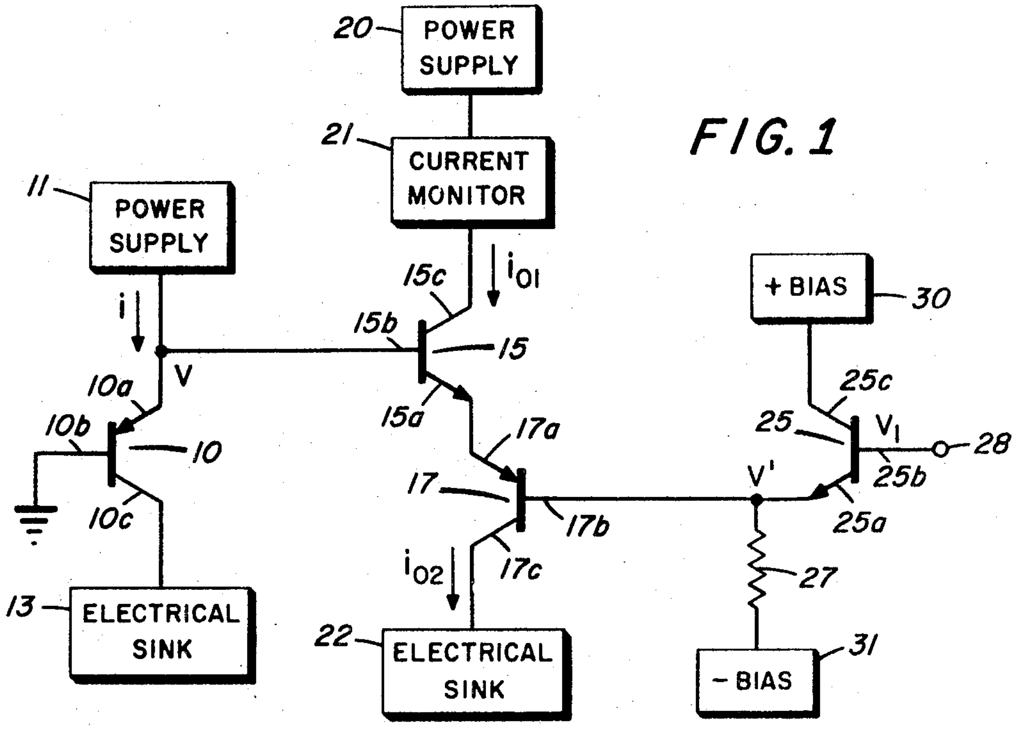
FIG. 1 is a schematic of a square root extraction circuit employing the principles of this invention.

Referring now to the drawings where like reference numbers refer to like elements and referring more particularly to FIG. 1, there is seen the schematic of a square root extractor taking advantage of the relationships of equation (2) and illustrating the principles of my invention. An input transistor 10 having its base electrode **10*b* grounded and its collector electrode 10*c*** connected to an electrical sink, has injected a current *i* into its emitter electrode from electrical power supply 11, typically a current source, resulting in a voltage V across its emitter-base junction. An output transistor 15 oppositely poled from a second output transistor 17 and connected emitter to emitter therewith has a base electrode **15*b* connected to the emitter electrode 10*a* of transistor 10, thus impressing voltage V thereon. A second electrical power supply 20, typically a voltage source 20, is connected to collector 15*c* while a second electrical sink 22 is connected to collector electrode 17*c*. Current $i_{01}$ flows from power supply 20 to collector 15***c* and is monitored by current monitor 21 while current $i_{02}$ flows from collector 17*c* to sink 22 in response to the voltage across base electrodes 15*b* and 17*b*. A fourth transistor 25 has emitter electrode 25*a* connected to base electrode 17*b* and resistor 27 and its base electrode 25*b* connected to a source 28 of voltage $V_1$. The series string of the collector-emitter circuit of transistor 25 with resistor 27 is connected across the voltage bias sources 30 and 31, establishing a voltage V′ at emitter electrode 25*a* and hence also at base electrode 17*b*. Thus, there is applied a voltage equal to V+V′ across the PN junctions connect in series of transistors 15 and 17 where V′ is determined by $V_1$.

Applying equation (2) to the circuit of FIG. 1 and assuming that negligible base current is drawn by any of the transistors shown, a valid assumption where standard transistors having high betas are used:

$$i_{01}=i_{02}=i_0 \qquad (4)$$

If the transistors are matched so that the voltage across base electrodes 15*b* and 17*b* divide equally $$V_T=V+V'=\frac{n_1 KT}{q}\ln\frac{i_0}{i_{s1}}+\frac{n_2 KT}{q}\ln\frac{i_0}{i_{s2}} \qquad (5)$$

where $V_T$ = voltage across base electrodes 15*b* and 17*b*
$i_{s1}$ = reverse saturation current transistor 15
$i_{s2}$ = reverse saturation current transistor 17

$$V_T=\frac{KT}{q}\left[\ln\left(\frac{i_0}{i_{s1}}\right)^{n_1}+\ln\left(\frac{i_0}{i_{s2}}\right)^{n_2}\right] \qquad (6)$$

Rearranging equation (6):

$$\frac{V_T q}{KT}=\ln\left(\frac{i_0}{i_{s1}}\right)^{n_1}\left(\frac{i_0}{i_{s2}}\right)^{n_2}=\ln\frac{i_0^{n_1+n_2}}{i_{s1}^{n_1} i_{s2}^{n_2}} \qquad (7)$$

Taking the antilogarithm of equation (7) and rearranging:

$$e^{\frac{V_T q}{KT}}=\frac{i_0^{n_1+n_2}}{i_{s1}^{n_1} i_{s2}^{n_2}} \qquad (8)$$

$$i_0^{n_1+n_2}=i_{s1}^{n_1} i_{s2}^{n_2} e^{\frac{V_T q}{KT}} \qquad (9)$$

$$i_0=(i_{s1}^{n_1} i_{s2}^{n_2})^{\frac{1}{n_1+n_2}} e^{\frac{V_T q}{(n_1+n_2)KT}} \qquad (10)$$

$$i_0=(i_{s1}^{n_1} i_{s2}^{n_2})^{\frac{1}{n_1+n_2}} e^{\frac{q}{KT(n_1+n_2)}(V+V')} \qquad (11)$$

At transistor 10:

$$V=\frac{nKT}{q}\ln\frac{i}{i_s} \qquad (12)$$

Substituting Equation 11 into Equation 12 and simplifying:

$$i_0=(i_{s1}^{n_1} i_{s2}^{n_2})^{\frac{1}{n_1+n_2}} e^{\frac{q}{KT(n_1+n_2)}\left(\frac{nKT}{q}\ln\frac{i}{i_s}\right)} e^{\frac{qV'}{KT(n_1+n_2)}} \qquad (13)$$

$$=(i_{s1}^{n_1} i_{s2}^{n_2})^{\frac{1}{n_1+n_2}}\left(\frac{i}{i_s}\right)^{\frac{n}{n_1+n_2}} e^{\frac{qV'}{KT(n_1+n_2)}} \qquad (14)$$

If $i_3$ = transistor 25 collector-emitter current $$i_3=i_{s3}e^{\frac{qV'}{n_3 KT}} \qquad (15)$$

$$\left(\frac{i_3}{i_{s3}}\right)^{\frac{n_3}{n_1+n_2}}=e^{\frac{qV'}{KT(n_1+n_2)}} \qquad (16)$$

Substituting Equation 16 into Equation 14 and simplifying:

$$i_0=\frac{\left(i_{s1}^{\frac{n_1}{n_1+n_2}}\right)\left(i_{s2}^{\frac{n_2}{n_1+n_2}}\right)\left(i^{\frac{n}{n_1+n_2}}\right)\left(i_3^{\frac{n_3}{n_1+n_2}}\right)}{\left(i_s^{\frac{n}{n_1+n_2}}\right)\left(i_{s3}^{\frac{n_1+n_2}{n_3}}\right)} \qquad (17)$$

When all transistors are matched:

$$n=n_1=n_2=n_3 \qquad (18)$$

$$i_{s1}=i_{s3} \qquad (19)$$

$$i_s=i_{s2} \qquad (20)$$

so that:

$$i_0=i^{1/2} i_3^{1/2} \qquad (21)$$

but: $i_3$ is a constant value determined by transistor 25, resistor 27 and bias sources 28, 30 and 31 thus:

$$i_0=K_1 i^{1/2} \qquad (22)$$

Thus, where *i* is controlled and is proportional to a quantity X, then $i_0$ is proportional to $X^{1/2}$. Note especially that $i_0$ is not a function of temperature, all temperature variable terms having cancelled out of the mathematical model.

Figure 2:
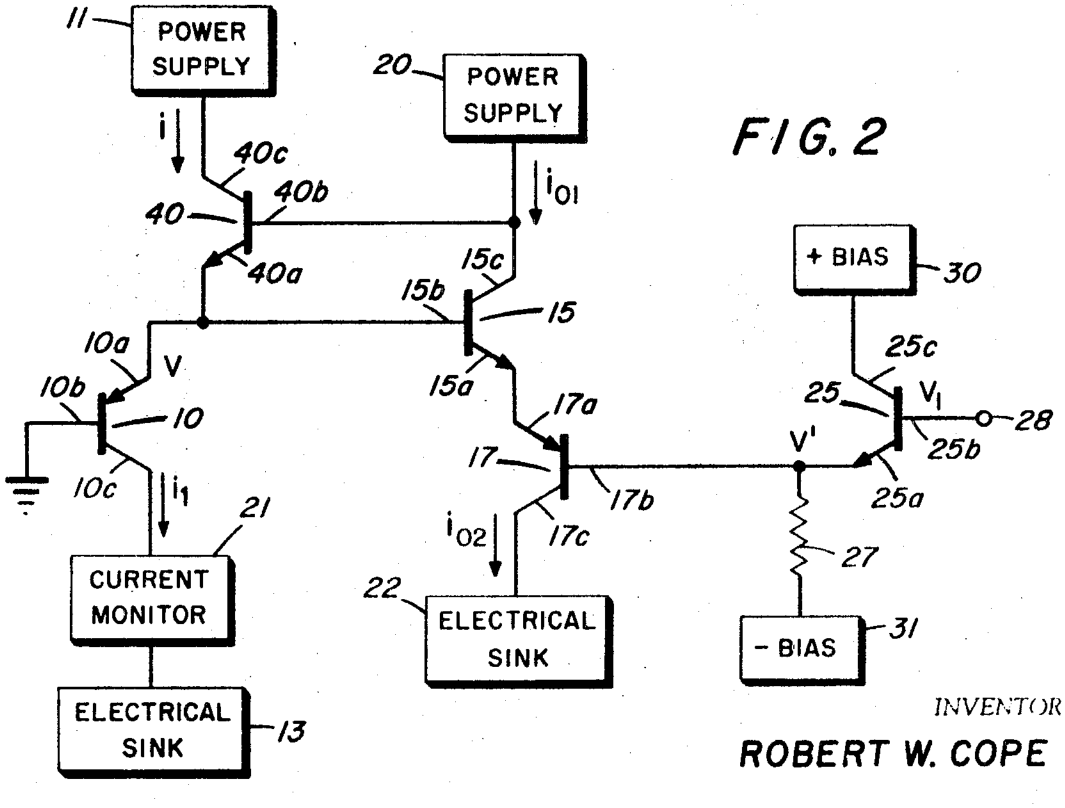
FIG. 2 is a schematic of a circuit similar to the circuits shown in FIG. 1, but modified to allow the circuit to be used as a squarer.

Referring now to FIG. 2 there is seen a circuit almost identical to that shown in FIG. 1, except for an additional transistor 40 which has its collector-emitter circuit connected between emitter 10*a* and power supply 11, which in this case should be a voltage source, and its base electrode 40*b* connected to collector 15*c*. The operation of this latter circuit is identical to the operation of the circuit of FIG. 1, except that a current $i_0$ proportional to a quantity X is injected from power supply 20, in this case a current source, into collector 15*c* and a resultant current *i* proportional to $X^2$ flowing through transistor 10 is monitored. The previously shown mathematical development is the same for this latter circuit. However, before the circuit of FIG. 1 can be operated as a squarer some means of current driving the base-emitter junctions of transistors 15 and 17 must be provided. This is provided in the circuit of FIG. 2 by transistor 40. Initially, when current is first injected into collector electrode 15*c*, transistor 15 is not forward biased and the current cannot flow therethrough. However, this injected current causes base current to flow in transistor 40, thus establishing a forward bias voltage at base electrode 15*b* and the circuit thereafter operates in a manner which should now be obvious. Briefly, current initially injected from power supply 20 flows in the base-emitter junctions of transistors 40, 15 and 17 respectively to forward bias these transistors. Thereafter, the operation of the circuit is identical to the operation of the circuit of FIG. 1. Thus:

$$i_{01}=K_1 i_1^{Y2} \qquad (23)$$

where $i_{01}$ is transistor 15 collector current, and
$i_1$ is transistor 10 collector current.

Rearranging the terms of (23) and squaring for clarity:

$$i_1=\frac{i_0^2}{K_1^2}=K_2 i_0^2 \qquad (24)$$

where, as before, $K_2$ is a constant determined by transistor 25, resistor 27 and bias sources 28, 30 and 31.

Thus, where $i_{01}$ is controlled and is proportional to a quantity X, then $i_1$ is proportional to $X^2$.

Once current flow is established through the collector-emitter circuits of transistors 15 and 17, transistor 40 becomes ineffectual and thus does not enter into the mathematical model of the circuit.

The invention I claim is:

1. A squaring or square-root-extracting circuit comprising
   a pair of oppositely poled transistors having commonly connected emitter electrodes, said pair having first and second base electrodes and first and second collector electrodes;
   a third transistor having third base, emitter and collector electrodes, said third emitter electrode being connected to said first base electrode;
   a first electrical power supply connected to said first collector electrode;
   a first electrical sink connected to said second collector electrode;
   a second electrical power supply connected to said third emitter electrode;
   a second electrical sink connected to said third collector electrode;
   means for applying a bias voltage to said second base electrode; and,
   means for applying a reference voltage to said third base electrode.
2. A circuit as recited in claim 1 with additionally:
   means for controlling the current flow through said third transistor emitter-collector circuit; and, means for monitoring the current flow through the emitter-collector circuits of said transistor pair.

3. A circuit as recited in claim 1 wherein said second base electrode biasing means comprises:

a resistance means;

a first voltage source;

a fourth transistor having a collector-emitter circuit serially connected with said resistance means across said voltage source, and having a fourth base electrode; and, means for applying bias voltage to said fourth base electrode.

4. A circuit as recited in claim 3 wherein said third and fourth transistors are oppositely poled.

5. A circuit as recited in claim 4 with additionally:

means for controlling the current flow through said third transistor emitter-collector circuit; and, means for monitoring the current flow through said transistor pair emitter-collector circuits.

6. A circuit as recited in claim 5 wherein said first electrical power supply comprises a second voltage source, and said second electrical power supply comprises a current source.

7. A circuit as recited in claim 1 with additionally:

a fifth transistor having fifth base, emitter and collector electrodes, said fifth transistor emitter-collector circuit being serially connected between said third emitter electrode and said second power supply, and said fifth base electrode being connected to said first collector electrode.

8. A circuit as recited in claim 7 wherein said fifth emitter electrode is connected to said third emitter electrode, said fifth collector electrode being connected to said second electrical power supply.

9. A circuit as recited in claim 8 with additionally:

means for monitoring the current flow through said third transistor emitter-collector circuit; and, means for controlling the current flow through the emitter-collector circuits of said transistor pair.

10 A circuit as recited in claim 8 wherein said second base electrode biasing means comprises:

a resistance means;

a first voltage source;

a fourth transistor having a collector-emitter circuit serially connected with said resistance means across said voltage source, and having a fourth base electrode; and, means for applying bias voltage to said fourth base electrode.

11. A circuit as recited in claim 10 wherein said third and fourth transistors are oppositely poled.

12. A circuit as recited in claim 11 with additionally:

means for controlling the current flow through said transistor pair emitter-collector circuits; and, means for monitoring the current flow through said third transistor emitter-collector circuit.

13. A circuit as recited in claim 12 wherein said first electrical power supply comprises a current source and said second electrical power supply comprises a second voltage source.